United States Patent Office 3,163,621
Patented Dec. 29, 1964

3,163,621
POLYAMIDES STABILIZED WITH STYRYL BENZENES OR STILBENES
Walter Stilz and Horst Pommer, Ludwigshafen (Rhine), Franz Schmidt, Mannheim, and Hans Biczysko and Heinz Fessmann, Ludwigshafen (Rhine), Germany, assignors to Badische Anilin- & Soda-Fabrik Aktiengesellschaft, Ludwigshafen (Rhine), Germany
No Drawing. Filed Oct. 23, 1961, Ser. No. 147,030
Claims priority, application Germany, Oct. 26, 1960, B 59,875; Aug. 29, 1961, B 63,819
17 Claims. (Cl. 260—45.7)

This invention relates to stabilized polyamides with carbonamide groups in the polymer chain, and to a process for their production.

Linear polyamides with constantly recurring carbonamide groups in the chain molecules, such as nylon, have acquired great industrial importance. As is well known, such linear polyamides may lose their good mechanical properties under the influence of light, oxygen or elevated temperatures. These adverse effects can be reduced by the addition of stabilizers. As stabilizers for polyamides there are known phenols, amines and urea derivatives, for example N-aryl substituted secondary aromatic polyamines, such as N,N'-diphenyl-1,4-phenylenediamine, N,N'-diphenyl-2,7-naphthylenediamine and N-phenyl-N'-benzylphenylenediamine. Stabilizers of this kind have the disadvantage that they can be washed out from the polyamides with water and also that they tend to migrate, which often considerably restricts their use.

We have found that mixtures of 99.99 to 95%, preferably 99.9 to 98%, by weight of a linear polyamide with constantly recurring carbonamide groups in the chain and 0.01 to 5%, preferably 0.1 to 2%, by weight of a bis-styrylbenzene or a stilbene which contains one to five —OR radicals attached directly to the benzene nuclei (R denoting hydrogen, alkyl with 1 to 4 carbon atoms, for example methyl, ethyl, isopropyl or butyl, cycloalkyl with 4 to 7 carbon atoms, for example cyclopentyl, aralkyl with 7 to 10 carbon atoms, such as benzyl, or —(CH$_2$)$_n$—O— where $n$ is one of the integers from 1 to 4 and the oxygens are attached directly in ortho-position to the benzene nucleus) are excellently stabilized against the action of heat and oxygen.

The bis-styrylbenzenes and stilbenes may also be represented by the general formula:

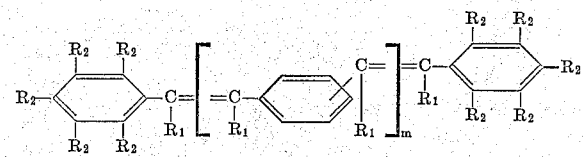

in which $m$ denotes zero or 1, $R_1$ denotes, for example, hydrogen, alkyl with 1 to 4 carbon atoms, cyano, carboxyl or an ester group whose alcoholic component is an alcohol with 1 to 4 carbon atoms, for example, butanol, and $R_2$ denotes, for example, hydrogen, alkyl, cycloalkyl, aralkyl, aryl, carboxyl, esterified carboxyl, amidated carboxyl, nitrile, bromine, chlorine, iodine, hydroxyl, alkoxyl, cycloalkoxyl, aralkoxyl or alkylenedioxy, for example methyl, ethyl, propyl, butyl, isopropyl, isobutyl, cyclohexyl, benzyl, methoxyl, methylenedioxy, ethylenedioxy, or carboxyl esterified with butanol. The terminal benzene nuclei contain at least one hydroxyl group, alkoxyl group, for example with 1 to 4 carbon atoms, cycloalkoxyl group, for example with 4 to 7 carbon atoms, aralkoxyl group, for example with 7 to 10 carbon atoms, or alkylenedioxy group, for example with 1 to 4 carbon atoms. The styryl radicals are attached to the central benzene nucleus preferably in ortho- or para-position.

Suitable stilbenes ($m$=zero) include:
4-carbomethoxy-3',4'-methylenedioxystilbene,
4-carbomethoxy-3'-methoxy-4'-hydroxystilbene,
3-carbomethoxy-3',4'-methylenedioxystilbene,
1-α-naphthyl-2-(3',4'-methylenedioxyphenyl)-ethylene,
3,4-methylenedioxy-β-cyanostilbene,
3-methoxy-4-hydroxystilbene,
3,4-methylenedioxy-β-carbomethoxystilbene and
3,4-methylenedioxy-4-chlorostilbene.

Suitable bis-styrylbenzenes ($m$=1) include:
1,4-bis-(3',4'-methylenedioxystyryl)-benzene,
1,3-bis-(3',4'-methylenedioxystyryl)-benzene,
1,2-bis-(3',4'-methylenedioxystyryl)-benzene,
1,4-bis-(2',4'-dimethoxystyryl)-benzene,
1,4-bis-(4'-hydroxystyryl)-benzene,
1,4-bis(4'-α-tetrahydrofuranyloxystyryl)-benzene,
1,4-bis-(3',4'-methylenedioxy-β-cyanostyryl)-benzene,
1,4-bis-(3',4'-methylenedioxystyryl)-2,5-dimethoxybenzene.

Polyamides which can be stabilized according to this invention include those prepared diamines and dicarboxylic acids, for example from hexamethylenediamine and adipic acid or m-xylylenediamine and adipic acid, as well as from lactams containing more than three ring carbon atoms, such as pyrrolidone, piperidone, caprolactam, caprylic lactam, dodecylic lactam or undecylic lactam. Polyamides which are especially suitable for stabilization according to the invention are, for example, those having a relative viscosity of 2.0 to 4.5, measured at a concentration of 1 gram of polyamide in 100 ml of 96% by weight sulfuric acid.

As a rule, the bis-styrylbenzenes or stilbenes are added to the polyamides in amounts of 0.01 to 5%, preferably 0.1 to 2% by weight. They may either be added to the monomers prior to condensation or polyaddition, or may be mixed, for example in a screw extruder or kneader, with the finished polyamide, if desired together with further additives, such as fillers, pigments, dulling agents or dyes.

The stabilizzed polyamide mixtures prepared according to this invention are characterized above all by improved heat resistance, and hence are especially suitable for the manufacture of fabrics, constructional parts and coatings which at high temperatures are subjected to high mechanical stresses. Thus, for example, polycaprolactam stabilized according to this invention is well suited for the production of tire cord. The stabilizers added to the polyamide do not migrate and are not washed out by water.

The invention will be further illustrated by, but is not limited to, the following examples. This parts specified in the examples are by weight.

*Example 1*

(I) 191 parts of caprolactam and 8 parts of hexamethylenediamine adipate are polymerized at 275° C. for 15 hours under nitrogen with the addition of 1 part of 3,4-methylenedioxy-4'-carbomethoxystilbene, spun in conventional manner by the melt spinning process into 60/10-denier filaments having a relative viscosity of 2.65 (measured in 96% sulfuric acid), drawn, and freed from low molecular weight constituents by boiling with water.

The filaments have a strength of 4.6 g./den.

(II) 190 parts of caprolactam and 8 parts of hexamethylenediamine adipate are polymerized under nitrogen with the addition of 2 parts of 3,4-methylenedioxy-4'-carbomethoxystilbene, spun, drawn and washed as described under (I). The filaments have a relative viscosity of 2.53, a count of 63/10 deniers and a strength of 4.5 g/den.

(III) For purposes of comparison, 192 parts of caprolactam and 8 parts of hexamethylenediamine adipate are polymerized, spun, drawn and washed as described under (I), but without the addition of a heat stabilizer.

The filaments have a relative viscosity of 2.68, a count of 58/10 deniers and a strength of 4.6 g./den.

To test the heat resistance, samples of the filaments prepared according to (I), (II) and (III) are stored in air at 190° C. in a drying cabinet for 1 hour and 3 hours, respectively. Then the residual strength of the treated filaments is determined at room temperature. The term "residual strength" designates the ratio of the measured strength of a filament after the heat treatment to the measured strength of the filament prior to the heat treatment, expressed as a percentage.

The residual strengths of the filament samples (I), (II) and (III) after treatment in air at 190° C. for 1 hour and 3 hours, respectively, are summarized in the following table:

| Filament sample | Residual strength in percent after heating at 190° C. for— | |
|---|---|---|
| | 1 hour | 3 hours |
| I | 93 | 73 |
| II | 96 | 80 |
| III | 39 | 35 |

*Example 2*

(IV) 191 parts of caprolactam and 8 parts of hexamethylenediamine adipate are polymerized under nitrogen with the addition of 1 part of 3-methoxy-4-hydroxy-4'-carbomethoxystilbene, spun, drawn and washed as described in Example 1. The filaments have a relative viscosity of 2.63, a count of 61/10 deniers and a strength of 4.7 g./den.

(V) 190 parts of caprolactam and 8 parts of hexamethylenediamine adipate are polymerized under nitrogen with the addition of 2 parts of 3-methoxy-4-hydroxy-4'-carbomethoxy stilbene, spun, drawn and washed as described in Example 1. The filaments have a relative viscosity of 2.50, a count of 64/10 deniers and a strength of 4.4 g./den.

The heat resistance of samples of the filaments prepared according to IV and V is tested as in Example 1 and compared with the heat resistance of the unstabilized filament sample (III) of Example 1.

The residual strengths of the filament samples (IV) and (V) and of the unstabilized sample (III) after treatment in air at 190° C. for 1 hour and 3 hours, respectively, are compared in the following table:

| Filament sample | Residual strength in percent after heating at 190° C. for— | |
|---|---|---|
| | 1 hour | 3 hours |
| IV | 89 | 68 |
| V | 99 | 82 |
| III | 39 | 35 |

*Example 3*

(VI) 191 parts of caprolactam and 8 parts of hexamethylenediamine adipate are polymerized under nitrogen with the addition of 1 part of 3,4-methylenedioxy-3'-carbo-methoxystilbene, spun, drawn and washed as described in Example 1. The filaments have a relative viscosity of 2.67, a count of 56/10 deniers and a strength of 4.5 g./den.

(VII) 190 parts of caprolactam and 8 parts of hexamethylenediamine adipate are polymerized under nitrogen with the addition of 2 parts of 3,4-methylenedioxy-3'-carbomethoxystilbene, spun, drawn and washed as described in Example 1. The filaments have a relative viscosity of 2.54, a count of 58/10 deniers and a strength of 4.7 g./den. The heat resistance of samples of the filaments prepared according to (VI) and (VII) is tested as in Example 1 and compared with the heat resistance of the unstabilized filament sample (III) of Example 1.

The residual strength of the filament samples (VI) and (VII) and the unstabilized sample (III) after treatment in air at 190° C. for 1 hour and 3 hours, respectively, are compared in the following table:

| Filament sample | Residual strength in percent after heating at 190° C. for— | |
|---|---|---|
| | 1 hour | 3 hours |
| VI | 90 | 70 |
| VII | 99 | 79 |
| III | 39 | 35 |

*Example 4*

(I) Granulated polycaprylic lactam with a K-value of 75.6 (according to Fikentscher) is melted in a screw extruder at 260° C. and forced by means of a spinning pump through a die with six orifices of 0.25 mm. diameter. The filaments harden in an air stream, and are then wound and drawn in conventional manner.

(II) 5 parts of 3,4-methylenedioxy-3'-carbomethoxystilbene is powdered onto 995 parts of granulated polycaprylic lactam. This material is melted in a screw extruder at 260° C., and spun and drawn in the manner described under (I).

Samples of the filaments prepared according to (I) and (II) are heated in air at 175° C. for 1 hour and 3 hours, respectively, while preventing shrinkage of the filaments. The residual strengths of the samples are compared in the following table:

| Filament sample | Residual strength in percent after heating at 175° C. for— | |
|---|---|---|
| | 1 hour | 3 hours |
| I (without stabilizer) | 54 | 39 |
| II (with 0.4% stabilizer added) | 85 | 79 |

*Example 5*

(I) Granulated polyhexamethylenediamine adipate with a K-value of 71.6 (according to Fikentscher) is melted in a screw extruder at 265° C. and forced by means of a spinning pump through a die with six orifices of 0.25 mm. diameter. The filaments harden in an air stream, and are then wound and drawn in conventional manner.

(II) 5 parts of 3,4-methylenedioxy-3'-carbomethoxystilbene is powdered onto 995 parts of granulated polyhexamethylenediamine adipate, and the material processed as described under (I).

Samples of the filaments prepared according to (I) and (II) are heated in air at 190° C. for 1 hour and 3 hours, respectively, while preventing shrinkage of the filaments. The residual strengths of the samples are compared in the following table:

| Filament sample | Residual strength in percent after heating at 190° C. for— | |
|---|---|---|
| | 1 hour | 3 hours |
| I (without stabilizer) | 48 | 40 |
| II (with 0.5% stabilizer added) | 84 | 73 |

Example 6

(I) Granulated poly-ω-aminoundecanoic acid with a K-value of 55.4 (according to Fikentscher) is melted in a screw extruder at 260° C. and forced by means of a spinning pump through a die with six orifices of 0.25 mm. diameter. The filaments harden in an air stream, and are then drawn and wound on bobbins in conventional manner.

(II) 5 parts of 3,4-methylenedioxy-3'-carbomethoxy-stilbene is powdered onto 995 parts of granulated poly-ω-aminoundecanoic acid, and the material processed as described under (I).

Samples of the filaments prepared according to (I) and (II) are heated in air at 175° C. for 1 hour and 3 hours, respectively, while preventing shrinkage of the filaments. The residual strengths of the samples are compared in the following table:

| Filament sample | Residual strength in percent after heating at 175° C. for— | |
|---|---|---|
| | 1 hour | 3 hours |
| I (without stabilizer) | 77 | 56 |
| II (with 0.5% stabilizer added) | 92 | 71 |

Example 7

(I) 950 parts of caprolactam is mixed with 50 parts of hexamethylenediamine adipate and polycondensed under flowing nitrogen for 15 hours at 265° C. The polyamide melt is then forced by means of a spinning pump, at a rate of 12 g./min., directly from the condensation reactor through a die with ten orifices of 0.3 mm. diameter. The filaments obtained are wound at a speed of 400 m./min. and drawn cold in the ratio 1:4.5. During this operation, they are combined to form a yarn consisting of sixty mono-filaments. After the monomers have been extracted in conventional manner by boiling with water, a yarn having a count of 360 deniers is obtained.

(II) Batches consisting of 940 parts of caprolactam and 50 parts of hexamethylenediamine adipate are mixed with 10 parts of (a) 1,4-bis-(3',4'-methylenedioxystyryl)-benzene,
(b) 1,3-bis-(3',4'-methylenedioxystyryl)-benzene,
(c) 1,4 - bis - (4' - α - tetrahydrofuranyloxystyryl) - benzene, and
(d) 1,4-bis-(4'-hydroxystyryl)-benzene, respectively, and the mixtures are polycondensed, spun, drawn and extracted with water as described under (I).

Samples of the yarns obtained from the mixtures (I) and (II), (a) to (d) are heated in a drying cabinet in air at 190 C., and the residual strength after various periods of heating is measured.

The following table shows the K-values (according to Fikentscher; 1% in sulfuric acid), the strengths prior to heating and the residual strengths (in percent of the breaking strength of the unheated yarns) of the various yarn samples after heating in air at 190 C. for 1 hour and 3 hours, respectively.

| Sample | K-value | Yarn strength (g./den.) | Residual strength in percent after heating for 190° C. for— | |
|---|---|---|---|---|
| | | | 1 hour | 3 hours |
| I | 72.5 | 6.4 | 38–45 | 26–30 |
| II (a) | 71.5 | 6.2 | 97 | 86 |
| II (b) | 72.8 | 6.1 | 91 | 79 |
| II (c) | 72.8 | 6.4 | 95 | 81 |
| II (d) | 73.4 | 6.5 | 92 | 76 |

Example 8

990 parts of monomer-free, granulated polycaprolactam (K-value 73; 1% in sulfuric acid; moisture content 0.06%) is intimately mixed with 10 parts of powdered 1,4 - bis - (3',4' - methylenedioxy - β - cyanostyryl) - benzene. The mixture is melted in a screw extruder at 290° C. and the melt forced, by means of a metering pump with a capacity of 10 g./min., through a die with ten orifices of 0.3 mm. diameter and spun into filaments which are taken off and wound at 400 m./min. The filaments are drawn cold in the ratio 1:4, combined into a 340-denier yarn, and extracted with water.

The residual strength is measured as described in Example 7. After heating in air at 190° C. for one hour, it is 90% of the breaking strength prior to heating; after heating for three hours, it is 89%.

Example 9

X parts of caprolactam and 50 parts of hexamethylenediamine adipate are mixed with Y parts of 1,4-bis-(3',4'-methylenedioxystyryl)-benzene. The mixtures are polycondensed, spun, drawn and extracted with water as described under (I) in Example 7.

Samples of the filaments obtained are heated in air at 190° C. for 1 hour and 3 hours, respectively, while preventing shrinkage. The residual strengths of the filaments in dependence on the amount of stabilizer added are summarized in the following table:

| X | Y | Residual strength in percent after heating at 190° C. for— | |
|---|---|---|---|
| | | 1 hour | 3 hours |
| 950 | 0 | 48 | 43 |
| 949 | 1 | 74 | 57 |
| 948 | 2 | 94 | 73 |
| 947 | 3 | 99 | 77 |
| 946 | 4 | 97 | 81 |
| 945 | 5 | 99 | 88 |

The filaments are worked into white rubber. After storing for three months in a light cabinet, the surface of the white rubber does not show discoloration. Filaments which have been stabilized by adding 0.5% of N,N'-diphenyl-1,4-phenylenediamine are subjected to the same test. After storing for six days under the same conditions, the surface of the white rubber shows a strong brownish discoloration. Stabilized cords which cause discoloration of rubber are unsuitable for many applications, for example for white-wall tires.

Example 10

(I) Granulated polycaprylic lactam with a K-value of 75.6 (according to Fikentscher) is melted at 260° C. in a screw extruder and forced by means of a spinning pump through a die with six orifices of 0.25 mm. diameter. The filaments harden in an air stream, and are then wound and drawn in conventional manner.

(II) 5 parts of 1,4-bis-(3',4'-methylenedioxystyryl)-benzene is powdered onto 995 parts of granulated polycaprylic lactam. The material is melted at 260° C. in a screw extruder, and spun and drawn as described under (I).

Samples of the filaments obtained are heated in air at 175° C. for 1 hour and 3 hours, respectively, while preventing shrinkage. The residual strengths of the samples are summarized in the following table:

| Filament sample | Residual strength in percent after heating at 175° C. for— | |
|---|---|---|
| | 1 hour | 3 hours |
| I (without stabilizer) | 54 | 39 |
| II (with 0.5% stabilizer added) | 100 | 93 |

Example 11

(I) Granulated polyhexamethylenediamine adipate with a K-value of 71.6 (according to Fikentscher) is melted in a screw extruder at 265° C. and forced by means of a spinning pump through a die with six orifices of 0.25 mm. diameter. The filaments harden in an air stream, and are then wound and drawn in conventional manner.

(II) 5 parts of 1,4-bis-(3',4'-methylenedioxystyryl)-benzene is powdered onto 995 parts of granulated polyhexamethylenediamine adipate, and the material processed as described under (I).

Samples of the filaments obtained are heated in air at 190° C. for 1 hour and 3 hours, respectively, while preventing shrinkage. The residual strengths of the samples are summarized in the following table:

| Filament sample | Residual strength in percent after heating at 190° C. for— | |
|---|---|---|
| | 1 hour | 3 hours |
| I (without stabilizer) | 48 | 40 |
| II (with 0.5% stabilizer added) | 86 | 77 |

Example 12

(I) Granulated poly-ω-aminoundecanoic acid with a K-value of 55.4 (according to Fikentscher) is melted at 260° C. in a screw extruder and forced by means of a spinning pump through a die with six orifices of 0.25 mm. diameter. The filaments harden in an air stream, and are then wound and drawn in conventional manner.

(II) 5 parts of 1,4-bis-(3',4'-methylenedioxystyryl)- benzene is powdered onto 995 parts of granulated poly-ω-aminoundecanoic acid, and the material processed as under (I).

Samples of the filaments obtained are heated in air at 175° C. for 1 hour and 3 hours, respectively, while preventing shrinkage. The residual strengths of the samples are summarized in the following table:

| Filament sample | Residual strength in percent after heating at 175° C. for— | |
|---|---|---|
| | 1 hour | 3 hours |
| I (without stabilizer) | 77 | 56 |
| II (with 0.5% stabilizer added) | 97 | 82 |

Example 13

945 parts of caprolactam and 50 parts of hexamethylene-diamine adipate are mixed with 5 parts of 1,2-bis-(3',4'-methylenedioxystyryl)-benzene. The mixture is polycondensed, spun, drawn and extracted with water as described under (I) in Example 7.

Samples of the filaments thus obtained and of unstabilized filaments prepared in the same manner are heated in air at 190° C. for 1 hour and 3 hours, respectively, while preventing shrinkage. The residual strengths of the samples are summarized in the following table:

| Filament sample | Residual strength in percent after heating at 190° C. for— | |
|---|---|---|
| | 1 hour | 3 hours |
| Without stabilizer | 51 | 38 |
| With 0.5% stabilizer added | 100 | 96 |

We claim:
1. A composition of matter comprising a mixture of 99.99 to 95% by weight of a linear polyamide having recurring carbonamide groups in the molecule chain and being selected from the group consisting of diamine dicarboxylic acid polycondensation products and lactam polycondensation products and 0.01 to 5% by weight of a compound selected from the group consisting of

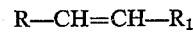

1,4,-bis(3',4'-methylenedioxy-β-cyanostyryl)-benzene.

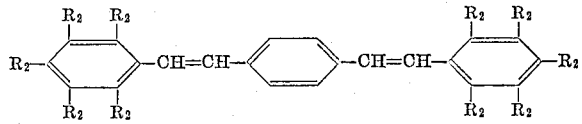

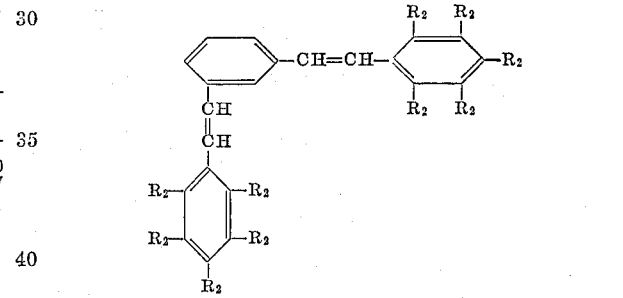

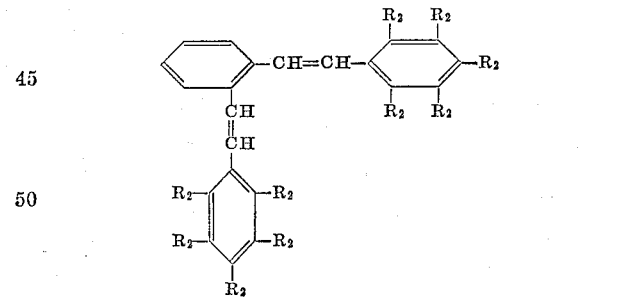

and

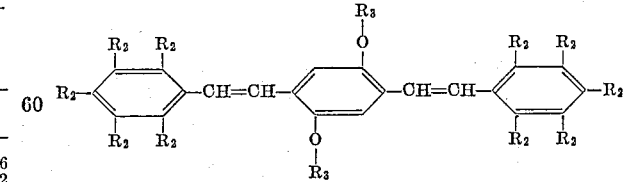

wherein R is a member selected from the group consisting of

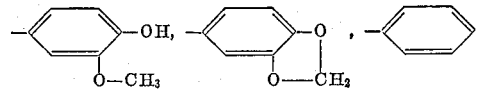

wherein $R_1$ is a member selected from the group consisting of

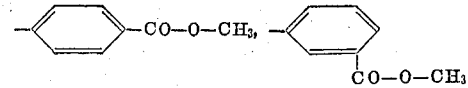

and

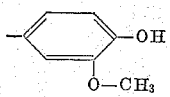

wherein $R_2$ is a member selected from the group consisting of hydrogen, alkyl with 1 to 4 carbon atoms, cycloalkyl with 4 to 7 carbon atoms, benzyl, carboxyl, carboxyl esterified with butanol, amidated carboxyl, hydroxyl, alkoxyl with 1 to 4 carbon atoms, cycloalkoxyl with 4 to 7 carbon atoms, aralkoxyl with 7 to 10 carbon atoms, and alkylenedioxy with 1 to 4 carbon atoms, the oxygens being attached in ortho position to the benzene nucleus, with the proviso that each terminal benzene nuclei contain at least one $R_2$ group selected from the group consisting of hydroxyl, alkoxyl with 1 to 4 carbon atoms, cycloalkoxyl with 4 to 7 carbon atoms, aralkoxyl with 7 to 10 carbon atoms, and alkylenedioxy with 1 to 4 carbon atoms, the oxygens being attached in ortho position to the benzene nucleus; and wherein $R_3$ is an alkyl of 1 to 4 carbon atoms.

2. A composition of matter comprising a mixture of 99.99 to 95% by weight of a linear polyamide having recurring carbonamide groups in the molecule chain and being selected from the group consisting of diamine dicarboxylic acid polycondensation products and lactam polycondensation products and 0.01 to 5% by weight of 1,4-bis-(3',4'-methylenedioxystyryl)-benzene.

3. A composition of matter comprising a mixture of 99.99 to 95% by weight of a linear polyamide having recurring carbonamide groups in the molecule chain and being selected from the group consisting of diamine dicarboxylic acid polycondensation products and lactam polycondensations products and 0.01 to 5% by weight of 1,3-bis-(3',4'-methylendioxystyryl)-benzene.

4. A composition of matter comprising a mixture of 99.99 to 95% by weight of a linear polyamide having recurring carbonamide groups in the molecule chain and being selected from the group consisting of diamine dicarboxylic acid polycondensation products and lactam polycondensation products and 0.01 to 5% by weight of 1,2-bis-(3',4'-methylenedioxystyryl)-benzene.

5. A composition of matter comprising a mixture of 99.99 to 95% by weight of a linear polyamide having recurring carbonamide groups in the molecule chain and being selected from the group consisting of diamine dicarboxylic acid polycondensation products and lactam polycondensation products and 0.01 to 5% by weight of 1,4-bis-(3',4'-methylendioxystyryl)-benzene.

6. A composition of matter comprising a mixture of 99.99 to 95% by weight of a linear polyamide having recurring carbonamide groups in the molecule chain and being selected from the group consisting of diamine dicarboxylic acid polycondensation products and lactam polycondensation products and 0.01 to 5% by weight of 1,4-bis-(4'-hydroxystyryl)-benzene.

7. A composition of matter comprising a mixture of 99.99 to 95% by weight of a linear polyamide having recurring carbonamide groups in the molecule chain and being selected from the group consisting of diamine dicarboxylic acid polycondensation products and lactam polycondensation products and 0.01 to 5% by weight of 1,4-bis-(4'-α-tetrahydrofuranyloxystyryl)-benzene.

8. A composition of matter comprising a mixture of 99.99 to 95% by weight of a linear polyamide having recurring carbonamide groups in the molecule chain and being selected from the group consisting of diamine dicarboxylic acid polycondensation products and lactam polycondensation products and 0.01 to 5% by weight of 1,4-bis-(3',4'-methylenedioxy-β-cyanostyryl)-benzene.

9. A composition of matter comprising a mixture of 99.99 to 95% by weight of a linear polyamide having recurring carbonamide groups in the molecule chain and being selected from the group consisting of diamine dicarboxylic acid polycondensation products and lactam polycondensation products and 0.01 to 5% by weight of 1,4-bis-(3',4'-methylenedioxystyryl)-2,5-dimethoxybenzene.

10. A composition of matter comprising a mixture of 99.99 to 95% by weight of a linear polyamide having recurring carbonamide groups in the molecule chain and being selected from the group consisting of diamine dicarboxylic acid polycondensation products and lactam polycondensation products and 0.01 to 5% by weight of 4-carbomethoxy-3',4'-methylenedioxystilbene.

11. A composition of matter comprising a mixture of 99.99 to 95% by weight of a linear polyamide having recurring carbonamide groups in the molecule chain and being selected from the group consisting of diamine dicarboxylic acid polycondensation products and lactam polycondensation products and 0.01 to 5% by weight of 4-carbomethoxy-3-methoxy-4'-hydroxystilbene.

12. A composition of matter comprising a mixture of 99.99 to 95% by weight of a linear polyamide having recurring carbonamide groups in the molecule chain and being selected from the group consisting of diamine dicarboxylic acid polycondensation products and lactam polycondensation products and 0.01 to 5% by weight of 3-carbomethoxy-3',4'-methylenedioxystilbene.

13. A composition of matter comprising a mixture of 99.99 to 95% by weight of a linear polyamide having recurring carbonamide groups in the molecule chain and being selected from the group consisting of diamine dicarboxylic acid polycondensation products and lactam polycondensation products and 0.01 to 5% by weight of 1-α-naphthyl-2-(3',4'-methylenedioxyphenyl)-ethylene.

14. A composition of matter comprising a mixture of 99.99 to 95% by weight of a linear polyamide having recurring carbonamide groups in the molecule chain and being selected from the group consisting of diamine dicarboxylic acid polycondensation products and lactam polycondensation products and 0.01 to 5% by weight of 3,4-methylenedioxy-β-cyanostilbene.

15. A composition of matter comprising a mixture of 99.99 to 95% by weight of a linear polyamide having recurring carbonamide groups in the molecule chain and being selected from the group consisting of diamine dicarboxylic acid polycondensation products and lactam polycondensation products and 0.01 to 5% by weight of 3-methoxy-4-hydroxystilbene.

16. A composition of matter comprising a mixture of 99.99 to 95% by weight of a linear polyamide having recurring carbonamide groups in the molecule chain and being selected from the group consisting of diamine dicarboxylic acid polycondensation products and lactam polycondensation products and 0.1 to 5% by weight of 3,4-methylenedioxy-β-carbomethoxystilbene.

17. A composition of matter comprising a mixture of 99.99 to 95% by weight of a linear polyamide having recurring carbonamide groups in the molecule chain and being selected from the group consisting of diamine dicarboxylic acid polycondensation products and lactam polycondensation products and 0.01 to 5% by weight of 3,4-methylenedioxy-4-chlorostilbene.

References Cited in the file of this patent

UNITED STATES PATENTS

| | | |
|---|---|---|
| 2,496,968 | Watson et al. | Feb. 7, 1950 |
| 2,520,052 | Neiderl et al. | Aug. 22, 1950 |
| 2,593,746 | Gleim et al. | Apr. 22, 1952 |

FOREIGN PATENTS

| | | |
|---|---|---|
| 906,523 | Great Britain | Sept. 26, 1962 |
| 920,988 | Great Britain | Mar. 13, 1963 |
| 1,108,220 | Germany | June 8, 1961 |
| 1,117,580 | Germany | Nov. 23, 1961 |
| 1,122,524 | Germany | Jan. 25, 1962 |
| 1,124,949 | Germany | Mar. 8, 1962 |
| 1,129,947 | Germany | May 24, 1962 |